(12) United States Patent
Katano

(10) Patent No.: US 9,847,649 B2
(45) Date of Patent: Dec. 19, 2017

(54) VOLTAGE CONVERTER SYSTEM AND CONTROL METHOD OF VOLTAGE CONVERTER SYSTEM

(71) Applicant: TOYOTA JIDOSHA KABUSHIKI KAISHA, Toyota-shi, Aichi-ken (JP)

(72) Inventor: Koji Katano, Toyota (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 0 days.

(21) Appl. No.: 15/413,874

(22) Filed: Jan. 24, 2017

(65) Prior Publication Data

US 2017/0222442 A1  Aug. 3, 2017

(30) Foreign Application Priority Data

Jan. 29, 2016 (JP) ................. 2016-015574

(51) Int. Cl.
  *G05F 1/00* (2006.01)
  *H02J 3/38* (2006.01)
  *H02M 3/158* (2006.01)
  *H02M 7/44* (2006.01)
  *H02M 1/08* (2006.01)
  *H02M 1/14* (2006.01)
  *H02M 1/32* (2007.01)
  (Continued)

(52) U.S. Cl.
  CPC ............ *H02J 3/387* (2013.01); *H02J 7/0068* (2013.01); *H02M 1/08* (2013.01); *H02M 1/14* (2013.01); *H02M 1/32* (2013.01); *H02M 3/158* (2013.01); *H02M 7/44* (2013.01); *H02M 2001/0009* (2013.01)

(58) Field of Classification Search
  CPC ............................ H02M 3/158; H02M 3/1584
  USPC .............................................. 323/272; 363/65
  See application file for complete search history.

(56) References Cited

U.S. PATENT DOCUMENTS

2006/0013024 A1* 1/2006 Temesi ................ H02M 1/4216
  363/44
2009/0316453 A1* 12/2009 Manabe .............. H02M 3/1582
  363/78

(Continued)

FOREIGN PATENT DOCUMENTS

JP     4410693    11/2009
JP     2015-19448  1/2015

*Primary Examiner* — Alex Torres-Rivera
(74) *Attorney, Agent, or Firm* — Finnegan, Henderson, Farabow, Garrett & Dunner, LLP

(57) ABSTRACT

A voltage converter system comprises a plurality of voltage conversion circuits, each of the voltage conversion circuits includes a reactor and a switching element, a controller, and a single current sensor connected with the reactors of two voltage conversion circuits and configured to be used in common by the two voltage conversion circuits in order to measure the reactor current. When only one voltage conversion circuit out of the two voltage conversion circuits is driven as an object circuit, the controller repeatedly performs a correction amount learning process. When the measured current value approaches the target value to be within a predetermined range or when the correction amount learning process has been performed a predetermined number of times, the controller changes the object circuit from the one voltage conversion circuit to the other voltage conversion circuit, and repeatedly performs the correction amount learning process.

8 Claims, 11 Drawing Sheets

(51) Int. Cl.
  *H02J 7/00*     (2006.01)
  *H02M 1/00*    (2006.01)

(56) References Cited

U.S. PATENT DOCUMENTS

| | | | |
|---|---|---|---|
| 2011/0032738 A1* | 2/2011 | Skinner | H02M 1/4208 |
| | | | 363/126 |
| 2013/0301327 A1* | 11/2013 | Wagoner | H02M 1/126 |
| | | | 363/132 |
| 2015/0084422 A1* | 3/2015 | Ishigaki | H01F 27/38 |
| | | | 307/43 |

* cited by examiner

Fig.8 ⟨NUMBER OF DRIVING PHASES= 2 (OBJECT CIRCUIT= SECOND CIRCUIT)⟩

VOLTAGE CONVERTER SYSTEM AND CONTROL METHOD OF VOLTAGE CONVERTER SYSTEM

CROSS-REFERENCE TO RELATED APPLICATIONS

The present application claims priority based on Japanese patent application No. 2016-015574 filed on Jan. 29, 2016, the disclosure of which is hereby incorporated by reference in its entirety.

BACKGROUND

Field

The present disclosure relates to a voltage converter system.

Related Art

A voltage converter system configured to convert an input voltage into a target voltage may be used, for example, in a fuel cell system to convert an output voltage of a fuel cell into a target voltage. The voltage converter system has a voltage conversion circuit including a reactor configured to serve as an inductance element and a switching element configured to control the magnitude of electric current flowing through the reactor (hereinafter called "reactor current"). The voltage converter system adjusts the duty ratio of opening and closing the switching element, so as to control the value of output voltage. In a voltage converter system equipped with a plurality of voltage conversion circuits, an inductance component of each reactor may be deviated from its designed value, due to the manufacturing error of each individual, a temperature change, aging and the like. In this case, even when the switching element is opened and closed at a duty ratio corresponding to a target value of reactor current, the flow of electric current is deviated from the target value of reactor current. This results in failing to output a target voltage. One configuration of the voltage converter system has accordingly been proposed to measure the value of reactor current flowing through each reactor and adjust the duty ratio based on the measured current value (as described in JP 2015-19448A).

In one possible configuration, one current sensor is provided for each reactor (each voltage conversion circuit), in order to measure the value of reactor current flowing through each reactor. This configuration enables the value of each reactor current to be accurately detected but increases the total number of current sensors. This causes problems, for example, expansion in size of the voltage converter system and an increase in manufacturing cost. One configuration of the voltage converter system has accordingly been proposed to provide one current sensor to be shared by two adjoining reactors (as described in JP 4410693B). In the voltage converter system described in JP 4410693B, however, the current sensor is configured to measure only a difference value between values of electric current flowing through the two adjoining reactors. This configuration fails to accurately detect the values of electric current flowing through the respective reactors. This results in failing to accurately adjust the duty ratios of the respective switching elements, based on the values of electric current flowing through the respective reactors. With regard to a voltage converter system equipped with a plurality of voltage conversion circuits, there is accordingly a demand for a technique that allows for accurate adjustment of the duty ratio in each of the voltage conversion circuits, while suppressing expansion in size of the voltage converter system and an increase in cost.

SUMMARY

According to one aspect of the disclosure, there is provided a voltage converter system configured to convert an input voltage into a target voltage. The voltage converter system comprises a plurality of voltage conversion circuits connected in parallel to one another, each of the voltage conversion circuits including a reactor and a switching element provided to control a reactor current that is an electric current flowing through the reactor and being configured to convert the input voltage into the target voltage, a controller programmed to change a duty ratio of opening and closing the switching element included in each of the voltage conversion circuits by using an output request for the plurality of voltage conversion circuits and a set correction amount that is set in each of the voltage conversion circuits, so as to control driving and stopping of each of the voltage conversion circuits and control magnitude of the reactor current flowing in each of the voltage conversion circuits, and a single current sensor connected with the reactors of two voltage conversion circuits out of the plurality of voltage conversion circuits and configured to be used in common by the two voltage conversion circuits, in order to measure the reactor current, wherein when only one voltage conversion circuit out of the two voltage conversion circuits is driven as an object circuit, the controller repeatedly performs a correction amount learning process, wherein the correction amount learning process determines a correction amount of the duty ratio of the object circuit such as to make a measured current value by the current sensor closer to a target value of the reactor current in the object circuit, and corrects the duty ratio of the object circuit based on the determined correction amount, and when the measured current value approaches the target value to be within a predetermined range or when the correction amount learning process has been performed a predetermined number of times, the controller sets a difference amount between a duty ratio before the correction and a duty ratio after the correction as the set correction amount, changes the object circuit from the one voltage conversion circuit to the other voltage conversion circuit, and repeatedly performs the correction amount learning process with regard to the object circuit after the change.

DESCRIPTION OF EMBODIMENTS

A. First Embodiment

A1. General Configuration of System

Figure 1:
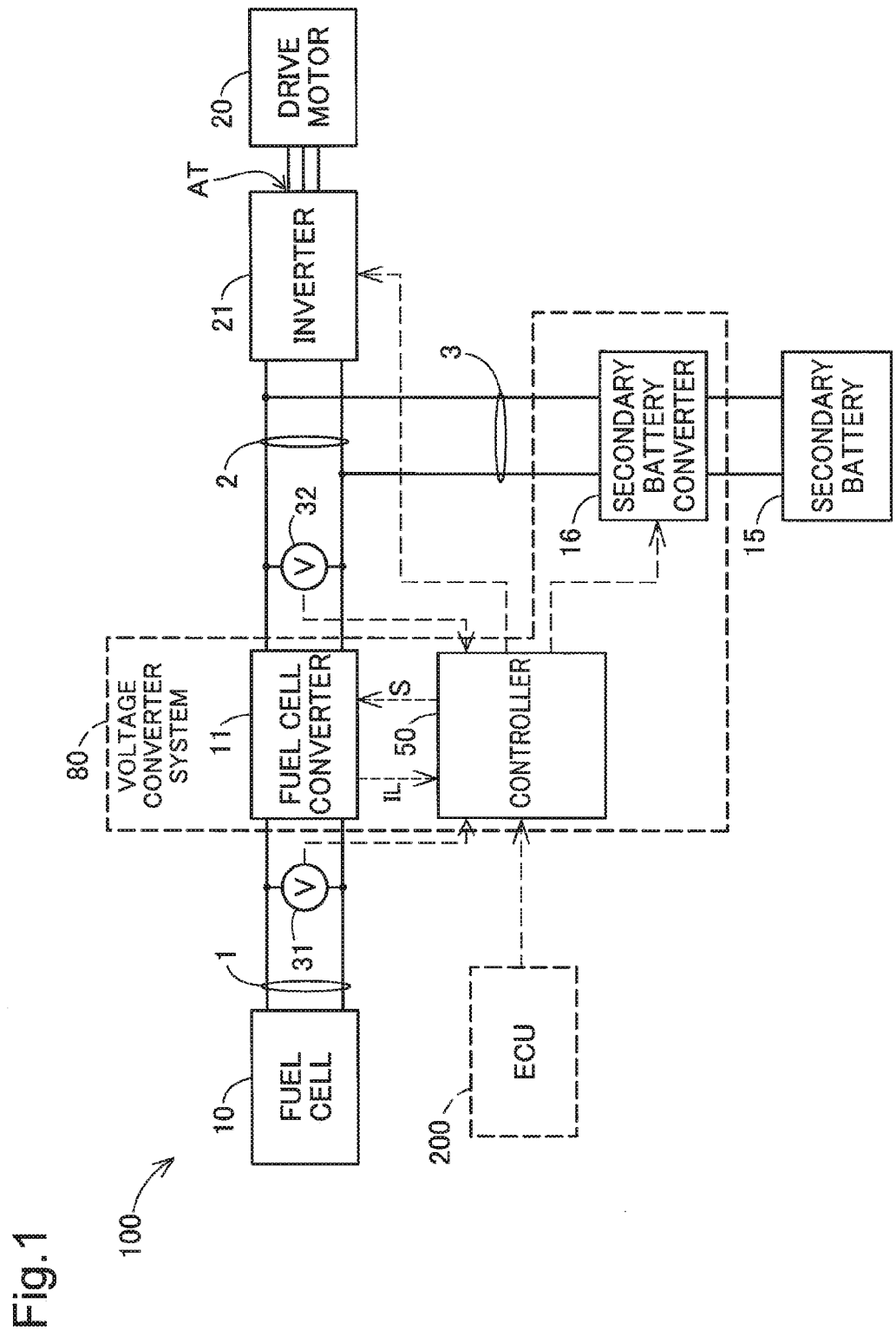
FIG. 1 is a schematic diagram illustrating the electrical configuration of a fuel cell system including a voltage converter system according to a first embodiment of the disclosure.

FIG. 1 is a schematic diagram illustrating the electrical configuration of a fuel cell system including a voltage converter system according to a first embodiment of the disclosure. This fuel cell system 100 is mounted on a fuel cell vehicle and is configured to generate a driving force of the fuel cell vehicle in response to a driver's request. The fuel cell system 100 may include a fuel cell 10, a voltage converter system 80, a secondary battery 15, a drive motor 20, an inverter 21, a first voltage detector 31, a second voltage detector 32 and a controller 50.

The fuel cell 10 serves as a power source of the fuel cell system 100 and may be provided as a polymer electrolyte fuel cell configured to generate electric power with supplies of a hydrogen gas and the air as reactive gases. The fuel cell 10 is, however, not limited to the polymer electrolyte fuel cell, but any of various other types of fuel cells may be employed for the fuel cell 10. For example, a solid oxide fuel cell may be employed for the fuel cell 10, in place of the polymer electrolyte fuel cell. The fuel cell 10 is connected with an input terminal of a fuel cell converter 11 via a first DC conductor line 1.

The voltage converter system 80 may be configured to convert an input voltage from the fuel cell 10 and the secondary battery 15 into a target voltage or more specifically into a target voltage corresponding to a required torque of the drive motor 20. The voltage converter 80 may include the fuel cell converter 11, a secondary battery converter 16 and the controller 50.

The fuel cell converter 11 may be provided as a boost converter configured to step up a voltage input from the fuel cell 10 to a target voltage and output the stepped-up target voltage, in response to a command from the controller 50. The fuel cell converter 11 has an output terminal that is connected with a DC terminal of the inverter 21 via a second DC conductor line 2. The detailed configuration of the fuel cell converter 11 will be described later. The fuel cell converter 11 may also be configured to send a measured value IL of reactor current to the controller 50 via a signal line.

The secondary battery converter 16 may be configured to, in cooperation with the fuel cell converter 11, adjust an input voltage of the inverter 21 (i.e., a voltage in the second DC conductor line 2), in response to a command from the controller 50. The secondary battery converter 16 may also be configured to control charging and discharging of the secondary battery 15. More specifically, when an output power of the fuel cell 10 is insufficient relative to a target output power, the secondary battery converter 16 discharges the secondary battery 15. When a regenerative power is generated by the drive motor 20, on the other hand, the secondary battery converter 16 causes the regenerative power to be stored in the secondary battery 15.

The controller 50 may be configured as a microcomputer including a CPU, a RAM and a ROM, although not being specifically illustrated. The controller 50 may be configured to control the fuel cell converter 11, the secondary battery converter 16 and the inverter 21 so as to control the outputs of the fuel cell 10 and the secondary battery 15 and thereby cause the drive motor 20 to generate a driving force corresponding to an external output request. The controller 50 is connected electrically with the fuel cell converter 11, the secondary battery converter 16 and the inverter 21 via signal lines.

The controller 50 may be configured to generate a control signal S according to an output request received from an ECU (electronic control unit) 200 mounted on the fuel cell vehicle and according to a correction amount of duty ratio described later and to send the generated control signal S to the fuel cell converter 11, so as to control the operations of the fuel cell converter 11. The details of the control signal S will be described later. The "output request" herein means an output power required for the fuel cell converter 11 (i.e., a required current value and a required voltage value), in order to cause the drive motor 20 to generate a torque that is determined from, for example, a depression amount of an accelerator pedal (not shown). The controller 50 may also be configured to use the measured value IL of reactor current received from the fuel cell converter 11 to control the fuel cell converter 11. The details of a control method of the fuel cell converter 11 will be described later.

The secondary battery 15 may be configured by a lithium ion battery and serves, along with the fuel cell 10, as a power source of the fuel cell system 100. The secondary battery 15 is connected with an input terminal of the secondary battery converter 16 via a third DC conductor line 3. The secondary battery converter 16 may be provided as a boost converter having the similar configuration to that of the fuel cell converter 11. The secondary battery converter 16 has an output terminal that is connected with the second DC conductor line 2 via the third DC conductor line 3.

The drive motor 20 serves as a power source to drive wheels of the fuel cell vehicle and may be configured by, for example, a three-phase AC motor. The drive motor 20 is connected with an AC terminal AT of the inverter 21 via an AC conductor line. The inverter 21 may be configured to convert a DC power supplied from the fuel cell 10 and the secondary battery 15 via the second DC conductor line 2 into a three-phase AC power and supply the converted three-phase AC power to the drive motor 20, in response to a command from the controller 50. The inverter 21 may also be configured to convert a regenerative power generated by the drive motor 20 into a DC power and output the converted DC power to the second DC conductor line 2.

The first voltage detector 31 is connected with the first DC conductor line 1 and is configured to measure an input voltage of the fuel cell converter 11. The second voltage detector 32 is connected with the second DC conductor line 2 and is configured to measure an output voltage of the fuel cell converter 11. The first voltage detector 31 and the second voltage detector 32 respectively output the measured values of the input voltage and the output voltage of the fuel cell converter 11 to the controller 50.

A2. Detailed Configuration of Fuel Cell Converter 11

Figure 2:
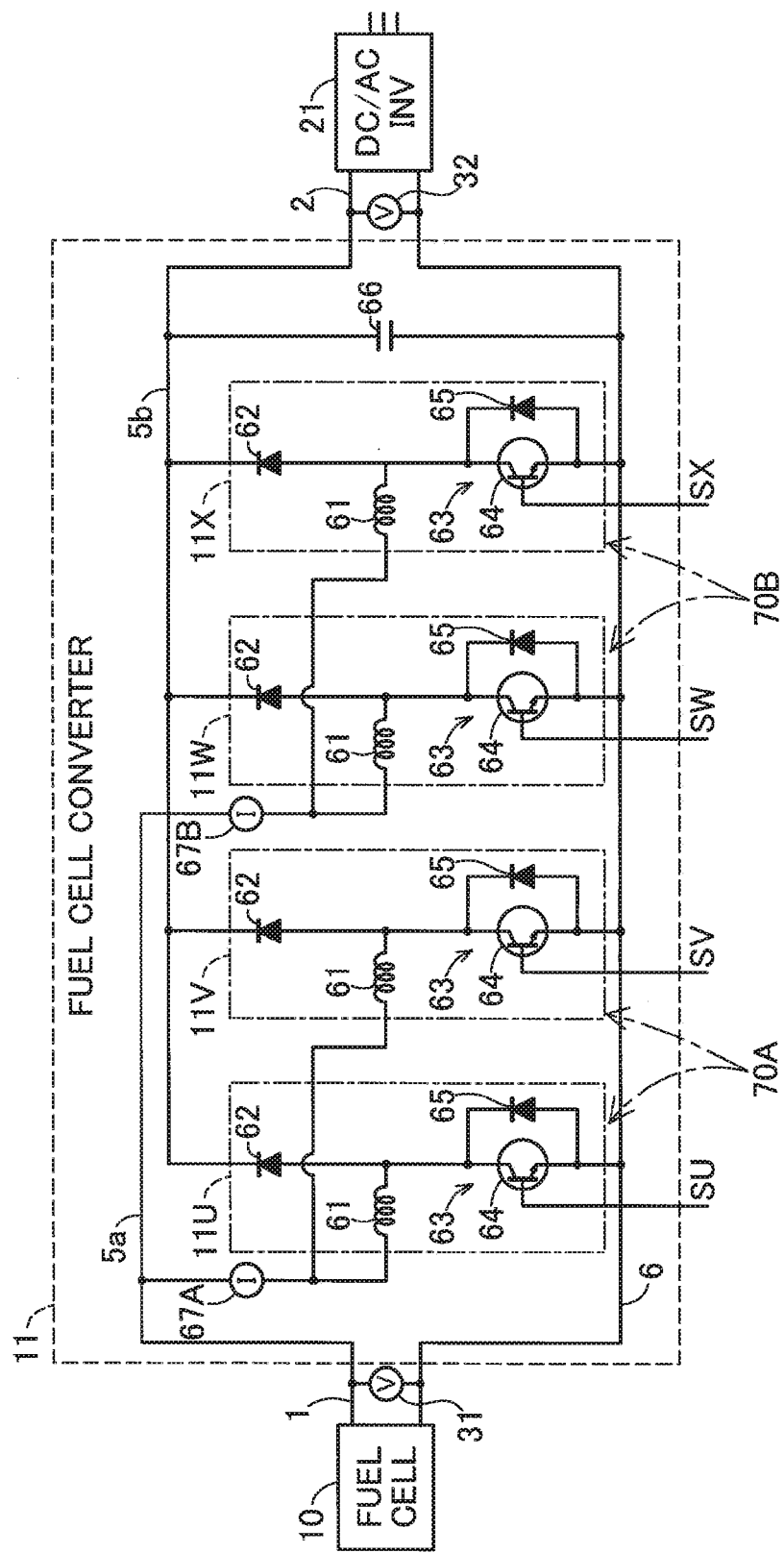
FIG. 2 is a block diagram illustrating the detailed configuration of the fuel cell converter.

FIG. 2 is a block diagram illustrating the detailed configuration of the fuel cell converter 11. The third DC conductor line 3 connected with the second DC conductor line 2 is omitted from FIG. 2 for the simplicity of illustration.

The fuel cell converter 11 may include four voltage conversion circuits connected in parallel to one another (first voltage conversion circuit 11U, second voltage conversion circuit 11V, third voltage conversion circuit 11W and fourth voltage conversion circuit 11X) and two current sensors (first current sensor 67A and second current sensor 67B). Each of the voltage conversion circuits 11U to 11X is electrically connected with a first power line 5a, a second power line 5b and a ground line 6. The first power line 5a is a power line of the fuel cell 10 that is connected with the first DC conductor line 1. The second power line 5b is a power line of the inverter 21 that is connected with the second DC conductor line 2. The ground line 6 is a common grounding line shared by the fuel cell 10 and the inverter 21. A smoothing capacitor 66 is placed between the second power line 5b and the ground line 6 to be arranged after the respective voltage conversion circuits 11U to 11X. The smoothing capacitor 66 is configured to reduce a voltage variation between the second power line 5b and the ground line 6.

Each of the voltage conversion circuits 11U to 11X may include a reactor 61, a diode 62 for output and a switching element 63. Both the reactor 61 of the first voltage conversion circuit 11U and the reactor 61 of the second power voltage circuit 11V are electrically connected with the first power line 5a via the first current sensor 67A. In other words, the first current sensor 67A is connected with the first voltage conversion circuit 11U and the second voltage conversion circuit 11V and is used in common by these two voltage conversion circuits 11U and 11V. Similarly, both the reactor 61 of the third voltage conversion circuit 11W and the reactor 61 of the fourth voltage conversion circuit 11X are electrically connected with the first power line 5a via the second current sensor 67B. In other words, the second current sensor 67B is connected with the third voltage conversion circuit 11W and the fourth voltage conversion circuit 11X and is used in common by these two voltage conversion circuits 11W and 11X. According to this embodiment, each of the reactors 61 is an iron core reactor. An air core reactor may also be employed for the reactor 61, in place of the iron core reactor.

The first current sensor 67A is arranged to measure the electric current flowing through the reactor 61 of the first voltage conversion circuit 11U and the electric current flowing through the reactor 61 of the second voltage conversion circuit 11V. The second current sensor 67B is arranged to measure the electric current flowing through the reactor 61 of the third voltage conversion circuit 11W and the electric current flowing through the reactor 61 of the fourth voltage conversion circuit 11X. In the description hereinafter, the electric current flowing through the reactor 61 included in each of the voltage conversion circuits 11U to 11X is called "reactor current". The first current sensor 67A sends the measured value of the reactor current of the first voltage conversion circuit 11U and the measured value of the reactor current of the second voltage conversion circuit 11V to the controller 50. The second current sensor 67B sends the measured value of the reactor current of the third voltage conversion circuit 11W and the measured value of the reactor current of the fourth voltage conversion circuit 11X to the controller 50.

In the description hereinafter, two voltage conversion circuits arranged to use a single current sensor in common are called "circuit set". More specifically, the first voltage conversion circuit 11U and the second voltage conversion circuit 11V are called first circuit set 70A. The third voltage conversion circuit 11W and the fourth voltage conversion circuit 11X are called second circuit set 70B.

The diode 62 included in each of the voltage conversion circuits 11U to 11X is arranged in a forward direction from an output side of the reactor 61 toward the second power line 5b. The switching element 63 is placed between the output side of the reactor 61 and the ground line 6. Each switching element 63 consists of a transistor 64 and a protection diode 65.

The transistor 64 included in each of the voltage conversion circuits 11U to 11X is an npn-type transistor and may be configured by, for example, an IGBT (insulated gate bipolar transistor), a power MOS (metal oxide semiconductor) transistor or a power bipolar transistor. The transistor 64 is connected such that its reactor 61-side serves as collector and its ground line 6-side serves as emitter. The protection diode 65 is connected between the collector and the emitter of the transistor 64 in a direction reverse to the flow direction of collector current.

Control signals SU, SV, SW and SX having duty ratios set by the controller 50 (as described later) are input from the controller 50 to base terminals of the transistors 64 of the respective voltage conversion circuits 11U to 11X. In the description hereof, as a matter of convenience, the controls signals SU, SV, SW and SX of the respective voltage conversion circuits 11U to 11X may not be distinguished from one another but may be collectively called "control signal S. The switching element 63 included in each of the voltage conversion circuits 11U to 11X is repeatedly turned on and off, in response to the input control signal S.

When the switching element 63 is turned on, electric current starts flowing from the fuel cell 10 through the reactor 61 to the switching element 63, and magnetic energy by DC excitation is accumulated into the reactor 61. When the switching element 63 is turned off, the magnetic energy accumulated in the reactor 61 during a turn-on period of the switching elements 63 is output to the inverter 21 via the diode 62 and the second power line 5b. In other words, the magnetic energy is accumulated into the reactor 61 during a turn-on period of the switching element 63 when the electric current flows through the reactor 61. The accumulated magnetic energy is then released during a turn-off period of the switching element 63. Accordingly, controlling the duty ratio of opening and closing the switching element 63 may result in controlling the energy accumulated in the reactor 61 and thereby controlling the electric current flowing averagely (effective current) through the reactor 61 included in each of the voltage conversion circuits 11U to 11X.

An inductive voltage generated by the magnetic energy accumulated in the reactor 61 in response to a turn-off of the switching element 63 is superimposed on the output voltage of the fuel cell 10. This causes the output voltage of each of the voltage conversion circuits 11U to 11X, i.e., the voltage of the second power line 5b, to be higher than the output voltage of the fuel cell 10, i.e., the voltage of the first power line 5a.

When a plurality of voltage conversion circuits among all the voltage conversion circuits 11U to 11X are object voltage conversion circuits to be driven in response to an output request, the control signal S is sent to the respective object voltage conversion circuits, so as to sequentially and repeatedly turn on the switching elements 63 of the respective object voltage conversion circuits. The output voltage of each object voltage conversion circuit to be driven thus sequentially becomes higher than the output voltage of the fuel cell 10, and the voltage input into the inverter 21 is kept higher than the output voltage of the fuel cell 10. By the above series of operations, the fuel cell converter 11 steps up the voltage input from the fuel cell 10 to a target voltage and inputs the stepped-up target voltage to the inverter 21. According to this embodiment, the output voltages of the respective voltage conversion circuits 11U to 11X are controlled such as to sequentially turn on the switching elements 63 of the respective voltage conversion circuits 11U to 11X. Such control causes shifts in the phase of the output current from the respective voltage conversion circuits 11U to 11X. This reduces the value of ripple current in the smoothing capacitor 66 and reduces the capacity of the smoothing capacitor 66. In the description hereinafter, the first voltage conversion circuit 11U may be called U phase. The second voltage conversion circuit 11V may be called V phase, the third voltage conversion circuit 11W may be called W phase, and the fourth voltage conversion circuit 11X may be called X phase.

Figure 3:
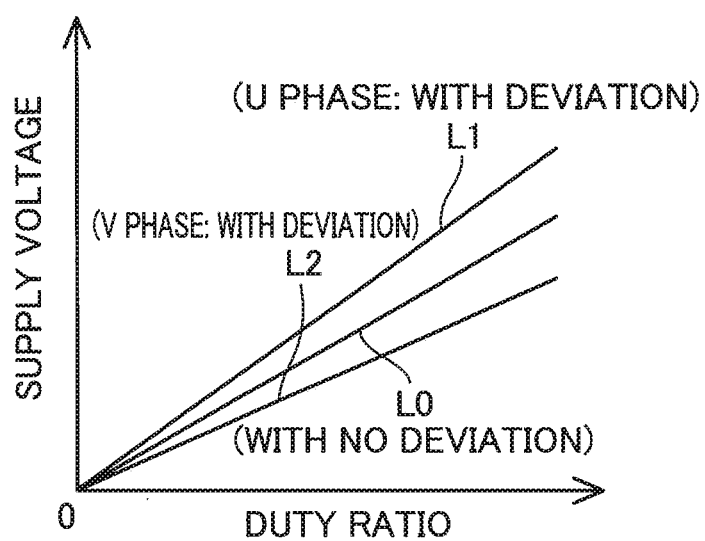
FIG. 3 is a diagram showing relationships between the duty ratio and the output voltage with regard to the first voltage conversion circuit and the second voltage conversion circuit.

An inductance component of each reactor 61 is likely to be deviated from its designed value, due to the manufacturing error of each individual, a temperature change, aging and the like. In this case, driving the switching element 63 at a duty ratio determined in response to an output request may fail to provide the reactor current according to the output request and thereby result in changing a step-up ratio in the fuel cell converter 11 and failing to supply a voltage according to the output request. The fuel cell converter 11 of this embodiment is, however, configured to respectively measure the reactor currents of the respective voltage conversion circuits 11U to 11X, learn adequate correction amounts for correcting the respective duty ratios based on differences between the obtained measured values and target current values (i.e., required current values) and perform feedforward to correct the duty ratios with the learnt correction amounts. This feedforward causes each switching element 63 to be driven at an appropriate duty ratio. The adequate correction amount obtained by learning as described above corresponds to the subordinate concept of the set correction amount in the claims. FIG. 3 is a diagram showing relationships between the duty ratio and the output voltage with regard to the first voltage conversion circuit 11U and the second voltage conversion circuit 11V. A straight line L0 shown in FIG. 3 indicates a relationship between the duty ratio and the supply voltage in the case where the inductance component of the reactor 61 included in each of the two voltage conversion circuits 11U and 11V has no deviation from its designed value. A straight line L1 indicates a relationship in the case where the inductance component of the reactor 61 in the first voltage conversion circuit 11U has a deviation from its designed value. A straight line L2 indicates a relationship in the case where the inductance component of the reactor 61 in the second voltage conversion circuit 11V has a deviation from its designed value. In the control process described below, the correction amounts of the respective duty ratios are determined by learning, such as to make the two straight lines L1 and L2 close to the straight line L0. The respective voltage conversion circuits 11U and 11 are then driven at corrected duty ratios that are obtained by applying the determined correction amounts to the duty ratios determined from the required current values. A voltage according to the output request is accordingly supplied from the voltage converter system 80 via the inverter 21 to the drive motor 20.

The total number of current sensors, i.e., "2", included in the fuel cell converter 11 is less than the total number of voltage conversion circuits, i.e., "4". The fuel cell system 100 of the embodiment, however, performs a control process and a correction amount learning process described later, so as to determine adequate values as correction amounts of the respective duty ratios with high accuracy.

Various maps used for controlling the fuel cell converter 11 are stored in advance in the ROM of the controller 50. One example of the maps stored in the ROM is a map showing a correspondence relationship of the number of driving phases to the required current value (hereinafter called "driving phase number map"). The number of driving phases herein denotes a total number of phases that receives an input control signal with a non-zero value set as the duty ratio and supplies non-zero electric current to the smoothing capacitor 66, among the U to X phases. This driving phase number map is set such that the number of driving phases increases with an increase in required current value. Another example of the maps stored in the ROM is a map showing a correspondence relationship of the duty ratio to the required current value (hereinafter called "duty ratio map". Another example of the maps stored in the ROM is a map showing a correspondence relationship of the correction amount for correcting the duty ratio to the required current value and the duty ratio (hereinafter called "correction amount map"). This correction amount map is provided in each of the voltage conversion circuits 11U to 11X and is updated by the correction amount learning process described later.

A3. Control Process

Figure 4:
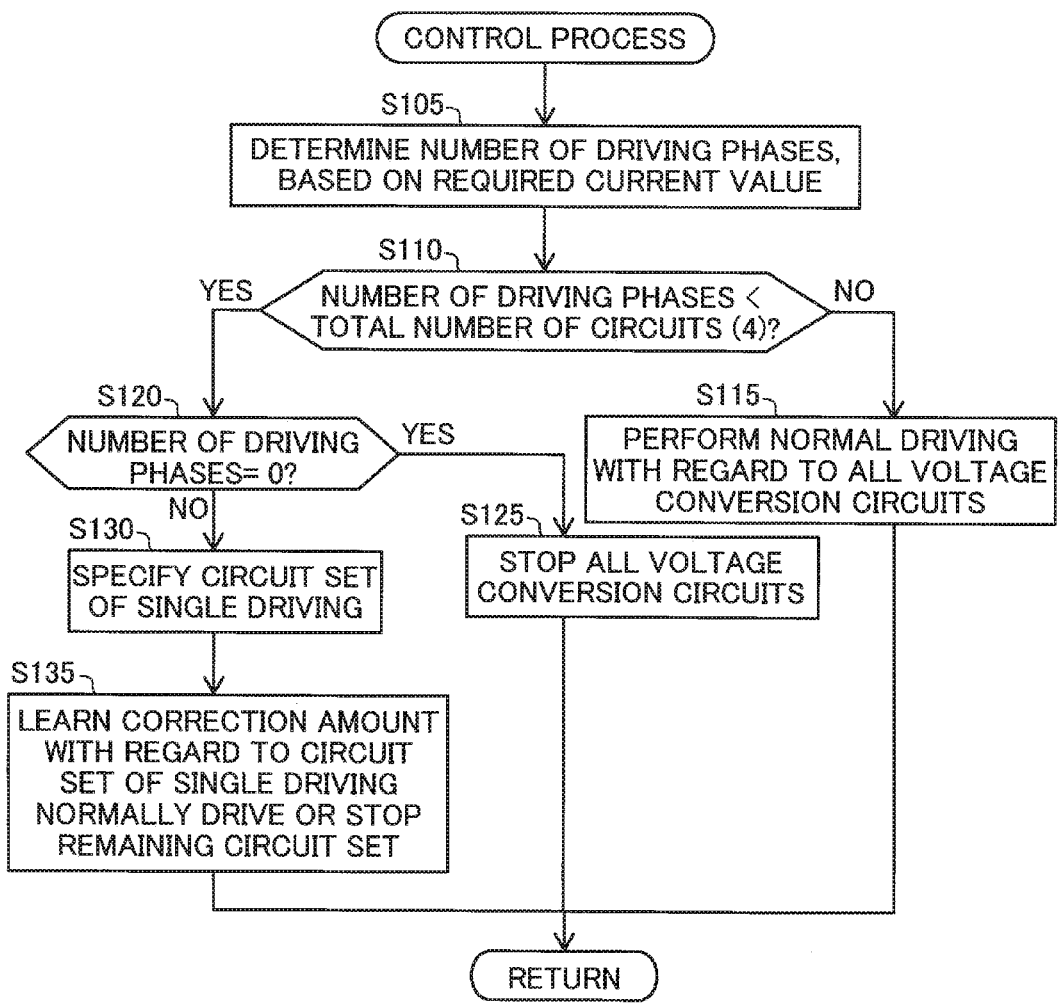
FIG. 4 is a flowchart showing a procedure of control process performed in the fuel cell system.

FIG. 4 is a flowchart showing a procedure of control process performed in the fuel cell system 100. The control process is triggered in the fuel cell system 100 by an ON operation of the start switch of the fuel cell vehicle. The control process herein denotes a process of controlling the fuel cell converter 11 in response to an output request.

The controller 50 refers to the driving phase number map stored in the ROM and determines the number of driving phases, based on an output request or more specifically based on a required current value for the fuel cell converter 11 (step S105). The controller 50 subsequently determines whether the number of driving phases determined at step S105 is less than the total number of the voltage conversion circuits, i.e., less than 4 (step S110).

When it is determined that the number of driving phases is not less than the total number of voltage conversion circuits but is equal to 4 (step S110: NO), the controller 50 performs normal driving with regard to all the voltage conversion circuits 11U to 11X (step S115) and returns to step S105. The number of driving phases is equal to 4 only in a limited state that requires an extremely large torque, for example, when the fuel cell vehicle runs on a steep uphill slope or when the fuel cell vehicle runs at an extremely high speed. The number of driving phases is thus less likely to be 4.

Figure 5:
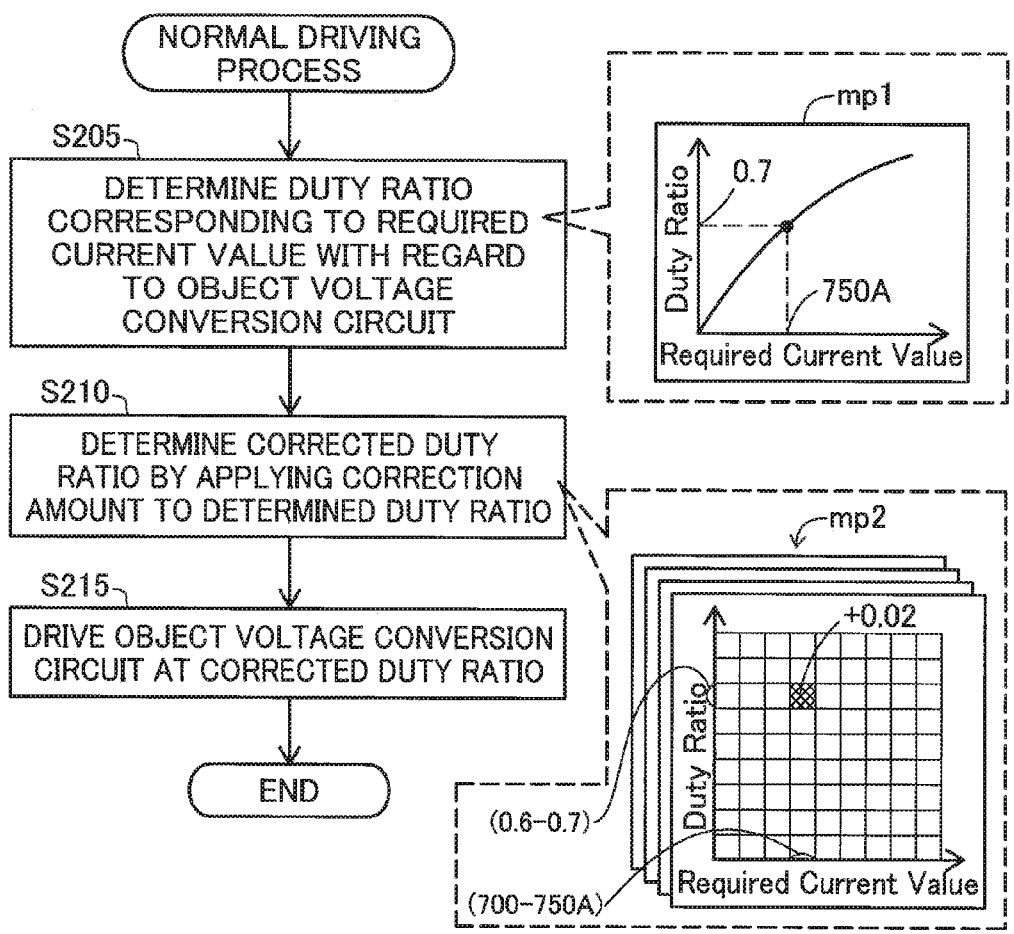
FIG. 5 is a flowchart showing a procedure of normal driving.

FIG. 5 is a flowchart showing a procedure of normal driving. The normal driving is performed not only at step S115 described above but at step S135 described later. The controller 50 refers to the duty ratio map and determines a duty ratio of an object voltage conversion circuit according to a required current value for the object voltage conversion circuit (step S205). In the normal driving performed at step S115 described above, the "object voltage conversion circuit" denotes each of the voltage conversion circuits 11U to 11X. The "required current value for the voltage conversion circuit" denotes a value obtained by dividing the required current value for the fuel cell converter 11 (i.e., total required current value) by the number of driving phases. For example, when the required current value for the fuel cell converter 11 (total required current value) is equal to "3000 A (ampere)" and the number of driving phases is determined to be "4", the required current value for each of the voltage conversion circuits 11U to 11X is equal to 750 A (ampere). In this case, the controller 50 refers to the duty ratio map and determines a duty ratio corresponding to the required current value of 750 A. FIG. 5 illustrates a duty ratio map mp1 as an example. In this duty ratio map mp1, a duty ratio "0.7" is provided corresponding to the required current value of 750 A.

The controller 50 refers to the correction amount map, determines the correction amount to be applied to the duty ratio determined at step S205 and determines a corrected duty ratio by applying the determined correction amount to the duty ratio (step S210). For example, when the required current value for each of the voltage conversion circuits 11U to 11X is 750 A and the determined duty ratio is 0.7, a correction amount corresponding to the required current value of "750 A" and the duty ratio of "0.7" is read from the correction amount map. FIG. 5 illustrates correction amount maps mp2 as an example. As described above, the correction amount maps mp2 are total of four maps respectively provided for the four phases (U to X phases). In the correction amount maps mp2, one correction amount is set corresponding to a predetermined width of required current value and corresponding to a predetermined width of duty ratio. In the correction amount map mp2 with regard to a certain phase, for example, a correction amount "+0.02" is provided corresponding to the required current value of "750 A" and the duty ratio of "0.7". When the correction amount is +0.02, the corrected duty ratio is determined to be 0.72 (=0.7+0.02).

The controller 50 sends the control signal S having the corrected duty ratio determined at step S210 to the object voltage conversion circuit, so as to drive the object voltage conversion circuit at the corrected duty ratio (step S215). Accordingly, at step S115 described above, all the voltage conversion circuits 11U to 11X are driven with, for example, the control signals SU to SX having the duty ratio of 0.72. In this example, an identical correction amount is set corresponding to a predetermined combination of the required current value and the duty ratio with regard to all the correction amount maps for the respective voltage conversion circuits 11U to 11X. When different correction amounts are set corresponding to a predetermined combination of the required current value and the duty ratio with regard to the correction amount maps for the respective voltage conversion circuits 11U to 11X, on the other hand, the control signals SU to SX having the different duty ratios are sent to the respective voltage conversion circuits 11U to 11X at step S215.

Referring back to FIG. 4, when it is determined at step S110 that the number of driving phases is less than the total number of the voltage conversion circuits (step S110: YES), the controller 50 subsequently determines whether the number of driving phases determined at step S105 is equal to 0 (step S120). When it is determined that the number of driving phases is equal to 0 (step S120: YES), the controller 50 stops all the voltage conversion circuits (step S125). More specifically, the controller 50 sends the control signals SU to SX having the duty ratio of "0" to all the voltage conversion circuits 11U to 11X. The controller 50 then returns to step S105 and repeats the above series of processing of steps S105 to S120.

When it is determined that the number of driving phases is not equal to 0 (step S120: NO), on the other hand, the controller 50 specifies a circuit set of single driving (step S130). The single driving herein denotes driving one voltage conversion circuit while stopping the other voltage conversion circuit out of the two voltage conversion circuits constituting each circuit set 70A or 70B. According to this embodiment, the number of driving phases is associated in advance with the circuit set of single driving. More specifically, when the number of driving phases is equal to "1" or "3", only the first circuit set 70A is specified as the circuit set of single driving. When the number of driving phases is equal to "2", both the first circuit set 70A and the second circuit set 70B are specified as the circuit set of single driving.

The controller 50 learns the correction amount with regard to the circuit set of single driving specified at step S130, while normally driving or stopping the remaining circuit set (step S135). More specifically, when the number of driving phases is equal to "1", the controller 50 learns the correction amount with regard to the first circuit set 70A, while stopping the remaining circuit set, i.e., the second circuit set 70B. When the number of driving phases is equal to "2", the controller 50 learns the correction amount with regard to both the first circuit set 70A and the second circuit set 70B. When the number of driving phases is equal to "2", the controller 50 learns the correction amount with regard to the first circuit set 70A, while normally driving the remaining circuit set, i.e., the second circuit set 70B. The "correction amount learning" process herein denotes a process of determining an adequate value as a correction amount of the duty ratio corresponding to the required current value for each of the voltage conversion circuits 11U to 11X and updating the set correction amount. The "normal driving" process herein denotes the above normal driving shown in FIG. 5. The "stopping" process herein denotes a process of sending the control signal S having the duty ratio of 0 to the object voltage conversion circuit like step S125 described above.

Figure 6:
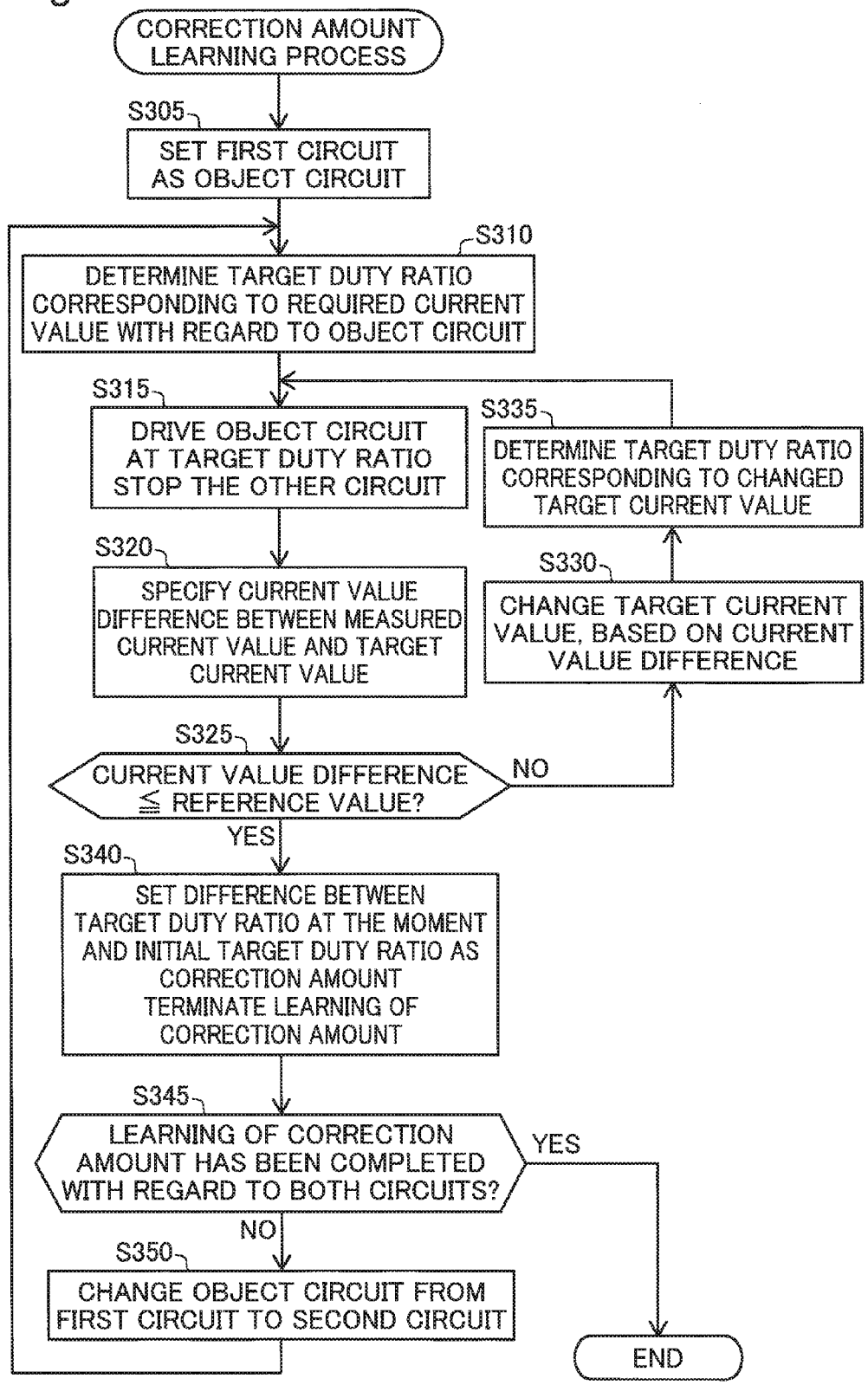
FIG. 6 is a flowchart showing a procedure of the correction amount learning process according to the first embodiment.

FIG. 6 is a flowchart showing a procedure of the correction amount learning process according to the first embodiment. The controller 50 sets one voltage conversion circuit (in the description hereinafter, called "first circuit" as a matter of convenience) out of the two voltage conversion circuits constituting the specified circuit set of single driving, as a circuit that is an object of correction amount learning (hereinafter called "object circuit") (step S305). For example, it is assumed that the number of driving phases is 2 and both the first circuit set 70A and the second circuit set 70B are specified as the circuit set of single driving at step S130 described above. With regard to the first circuit set 70A, the controller 50 may specify the first voltage conversion circuit 11U, out of the first voltage conversion circuit 11U and the second voltage conversion circuit 11V, as the first circuit and set the specified first circuit as the object circuit. With regard to the second circuit set 70B, the controller 50 may specify the third voltage conversion circuit 11W, out of the third voltage conversion circuit 11W and the fourth voltage conversion circuit 11X, as the first circuit and set the specified first circuit as the object circuit. The object circuit is changed from the first circuit to the second circuit after learning of the correction amount with regard to the first circuit is concluded as described later.

The controller 50 subsequently refers to the duty ratio map and determines a target duty ratio corresponding to the required current value with regard to the object circuit (step S310). The processing of step S310 is identical with the processing of step S205 in the normal driving process described above. The controller 50 drives the object circuit at the target duty ratio determined at step S310, while stopping the other circuit (step S315).

Figure 7:
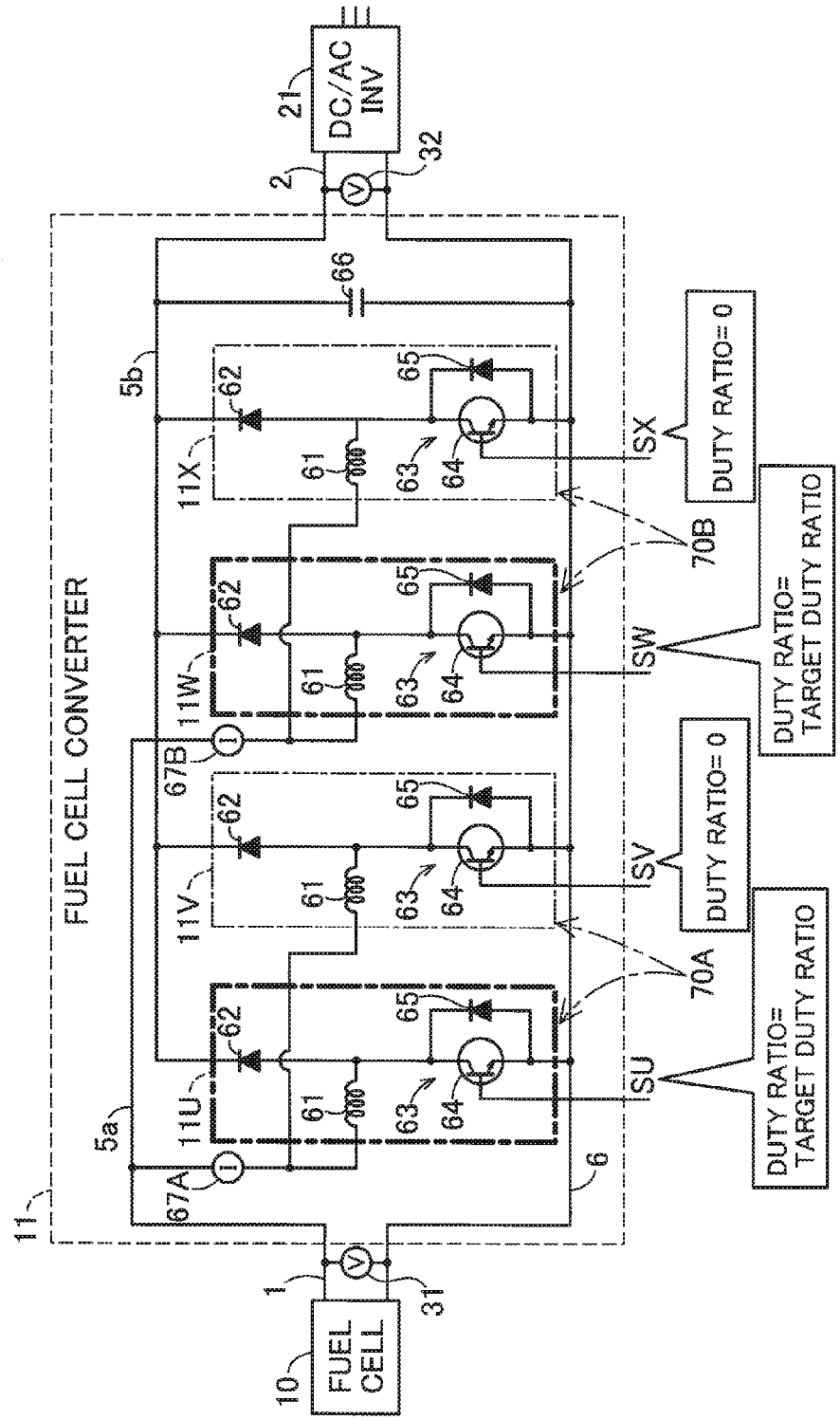
FIG. 7 is a diagram illustrating one example of the processing at step S315.

FIG. 7 is a diagram illustrating one example of the processing at step S315. FIG. 7 shows a processing example in the case where the number of driving phases is equal to 2 and the object circuit is the first circuit. In the illustrated example of FIG. 7, the first voltage conversion circuit 11U and the third voltage conversion circuit 11W are specified in advance as the first circuit, and the control signals SU and SW having the duty ratios that are equal to the target duty ratio are supplied to these two voltage conversion circuits 11U and 11W. The control signals SV and SX having the duty ratio of 0 are, on the other hand, supplied to the second voltage conversion circuit 11V and the fourth voltage conversion circuit 11X that are specified as the second circuit, so that these two voltage conversion circuits 11V and 11X are at stop. In this state, electric current flows through the reactor 61 of the first voltage conversion circuit 11U and through the reactor 61 of the third voltage conversion circuit 11W, while no electric current flows through the reactor 61 of the second voltage conversion circuit 11V and through the reactor 61 of the fourth voltage conversion circuit 11X.

Referring back to FIG. 6, after the processing of step S315, the controller 50 specifies a difference between a measured current value of the current sensor corresponding to the circuit set of single driving and a target current value for the voltage conversion circuit that is driven at the target duty ratio (hereinafter referred to as "current value difference") (step S320). The target current value herein denotes the required current value (output request). The current value difference specified at step S320 may be provided in the form of a current value (ampere) or in the form of a ratio of a differential current value to the target current value. As described above, the differential current value may be generated due to, for example, a deviation of the inductance component of each reactor 61 from its designed value as described above. When the object circuit is the first voltage conversion circuit 11U, electric current flows through the reactor 61 of the first voltage conversion circuit 11U, while no electric current flows through the reactor 61 of the second voltage conversion circuit 11V as described above. The measured current value by the first current sensor 67A used at step S320 accordingly indicates only a value of reactor current in the first voltage conversion circuit 11U. Similarly, when the number of driving phases is equal to 2, the measured current value by the second current sensor 67B used at step S320 indicates only a value of reactor current in the third voltage conversion circuit 11W.

The controller 50 subsequently determines whether the current value difference specified at step S320 is equal to or less than a predetermined reference value (step S325). When it is determined that the specified current value difference is greater than the predetermined reference value (step S325: NO), the controller 50 changes the target current value based on the specified current value difference (step S330), determines a target duty ratio corresponding to the changed target current value (step S335) and returns to step S315 described above. The series of processing of steps S315 to S335 described above is repeated to change the target duty ratio based on the current value difference when the current value difference is greater than the predetermined reference value, and drive the object circuit at the changed target duty ratio. Repeating this series of processing determines the duty ratio in the case where the current value difference becomes equal to or less than the predetermined reference value. A duty ratio difference between this determined duty ratio and the initial target duty ratio corresponds to an adequate correction amount for correcting the initial duty ratio, in order to provide an initial target current value. In other words, repeating the series of processing of steps S315 to S335 described above corresponds to learning an adequate correction amount. In the description hereinafter, the series of processing of steps S315 to S335 performed when the object circuit is the first circuit is called first correction amount learning process. The series of processing of steps S315 to S335 performed after the object circuit is changed to the second circuit as described later is called second correction amount learning process.

At step S330 described above, for example, a value obtained by multiplying the current value difference by a predetermined ratio may be subtracted from the initial target current value, and the difference may be set as the changed target current value. For example, when the current value difference is equal to +10 A, a value +5 A obtained by multiplying the current value difference of +10 A by a predetermined ratio of 0.5 may be subtracted from the initial target current value, and the difference may be set as the charged target current value. This configuration suppresses the occurrence of hunting in the course of repeating the series of processing to drive the object circuit at the target duty ratio corresponding to the changed target current value and further change the target current value based on the current value difference.

When it is determined that the current value difference becomes equal to or less than the predetermined reference value (step S325: YES), the controller 50 sets a duty ratio difference between the target duty ratio in this state and the initial target duty ratio as a correction amount in the correction amount map and terminates learning of the correction amount (step S340). In a subsequent normal driving process, the correction amount after learning is applied at step S210 shown in FIG. 5, and the object voltage conversion circuit is driven at an appropriate duty ratio.

After completion of step S340 in FIG. 6 described above, the controller 50 determines whether leaning the correction amount has been terminated with regard to both the circuits (step S345). When it is determined that learning of the correction amount has not yet been terminated with regard to both the circuits (step S345: NO), the controller 50 changes the object circuit from the first circuit to the second circuit (step S350) and returns to step S310 described above to perform the second correction amount learning process (steps S315 to S335).

Figure 8:
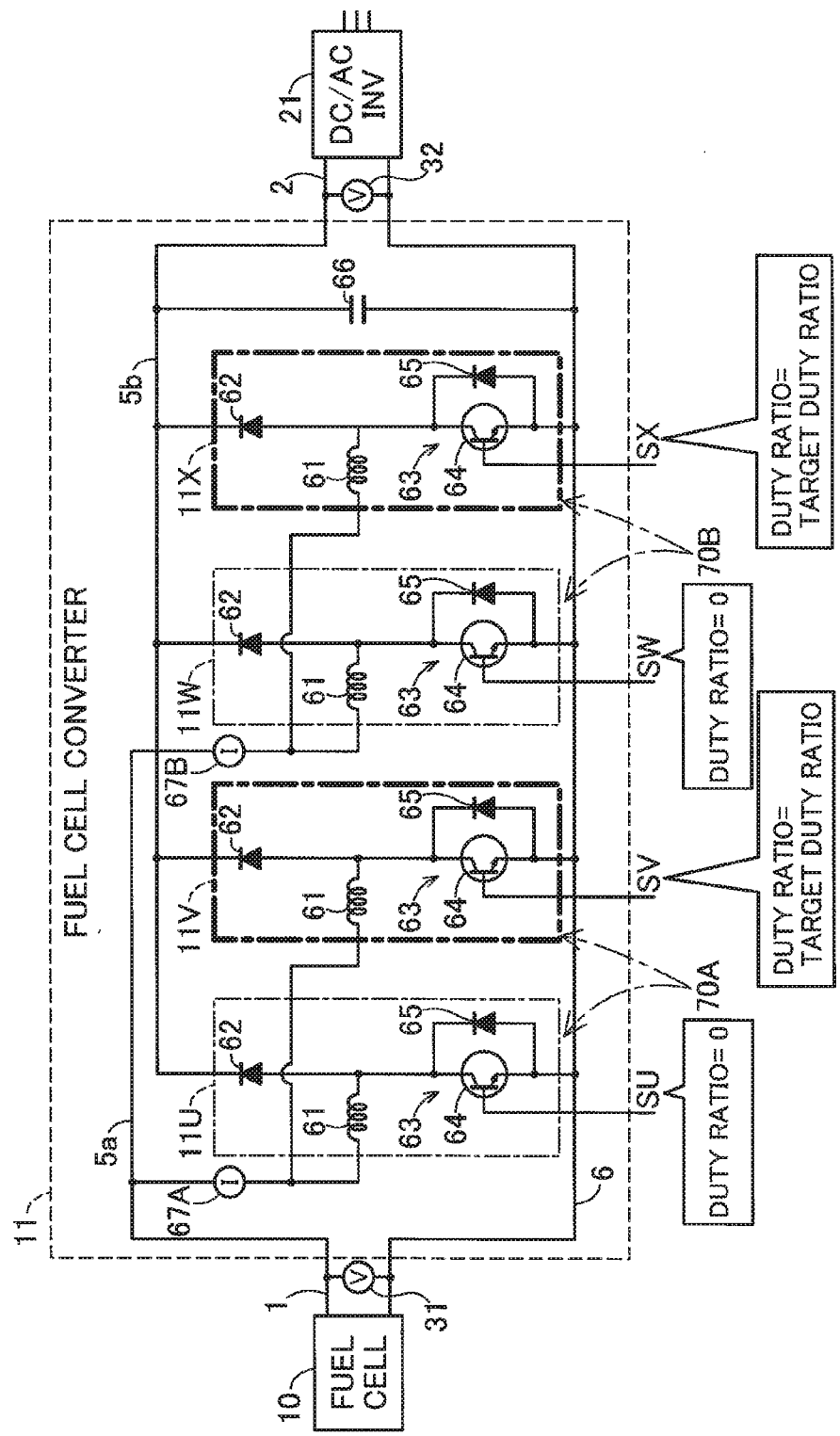
FIG. 8 is a diagram illustrating one example of the processing at step S315 in the second correction amount learning process.

FIG. 8 is a diagram illustrating one example of the processing at step S315 in the second correction amount learning process. FIG. 8 shows a processing example in the case where the number of driving phases is equal to 2 and the object circuit is the second circuit. In other words, FIG. 8 shows a processing example at step S315 performed when the object circuit is changed to the second circuit after the illustrated state of FIG. 7. When the object circuit is changed from the first circuit to the second circuit, contrary to the state shown in FIG. 7, the control signals SU and SW having the duty ratio of 0 are supplied to the two voltage conversion circuits 11U and 11W, so that these two voltage conversion circuits 11U and 11W are at stop. The control signals SV and SX having the duty ratio that is equal to the target duty ratio are, on the other hand, supplied to the other two voltage conversion circuits 11V and 11X. In this state, electric current flows through the reactor 61 of the second voltage conversion circuit 11V and through the reactor 61 of the fourth voltage conversion circuit 11X, while no electric current flows through the reactor 61 of the first voltage conversion circuit 11U and through the reactor 61 of the third voltage conversion circuit 11W. In this case, the measured current value by the first current sensor 67A accordingly indicates only a value of reactor current in the second voltage conversion circuit 11V. Similarly the measured current value by the second current sensor 67B indicates only a value of reactor current in the fourth voltage conversion circuit 11X.

Referring back to FIG. 6, when it is determined that learning of the correction amount has been completed with regard to both the circuits (step S345: YES), the controller terminates the correction amount learning process.

The fuel cell system 100 of the first embodiment described above drives the first circuit while stopping the second circuit with regard to the circuit set of single driving in the course of the first correction amount learning process. This configuration enables the value of reactor current in the first circuit to be accurately measured by the current sensors 67A and 67B that are used in common by the first circuit and the second circuit. This results in determining an adequate value as the correction amount of the duty ratio in the first circuit and thereby allows for accurate adjustment of the duty ratio in the first circuit. Similarly, the fuel cell system 100 of the first embodiment drives the second circuit while stopping the first circuit with regard to the circuit set of single driving in the course of the second correction amount learning process. This configuration enables the value of reactor current in the second circuit to be accurately measured by the current sensors 67A and 67B. This results in determining an adequate value as the correction amount of the duty ratio in the second circuit and thereby allows for accurate adjustment of the duty ratio in the second circuit. Additionally, the current sensors 67A and 67B used in the first correction amount learning process and in the second correction amount learning process are used in common by the first circuit and the second circuit. This configuration suppresses expansion in size of the fuel cell converter 11 and an increase in cost, compared with a configuration that current sensors are provided independently for the respective circuits.

The fuel cell system 100 performs the first correction amount learning process and the second correction amount learning process when the number of driving phases determined based on the required current value for the fuel cell converter 11 is less than the total number of voltage conversion circuits. This configuration enables the required current value to be output in the course of the first correction amount learning process and the second correction amount learning process. In other words, the fuel cell system 100 performs neither the first correction amount learning process nor the second correction amount learning process when the number of driving phases is equal to 4, i.e., when all the phases are to be driven. In this state, this configuration also enables the required current value to be output. The number of driving phases is equal to 4 only in the limited state, for example, when the fuel cell vehicle runs on a steep uphill slope. During normal driving, for example, the number of driving phases is more likely to be "1". According to this embodiment, this means that it is more likely to perform the first correction amount learning process and the second correction amount learning process during normal driving.

The fuel cell system 100 drives the respective voltage conversion circuits 11U to 11X such as to mutually shift the phases of the output currents from the respective voltage conversion circuits 11U to 11X. This reduces the value of ripple current in the smoothing capacitor 66 and reduces the capacity of the smoothing capacitor 66, compared with a configuration that does not shift the phases of the output currents.

B. Second Embodiment

Figure 9:
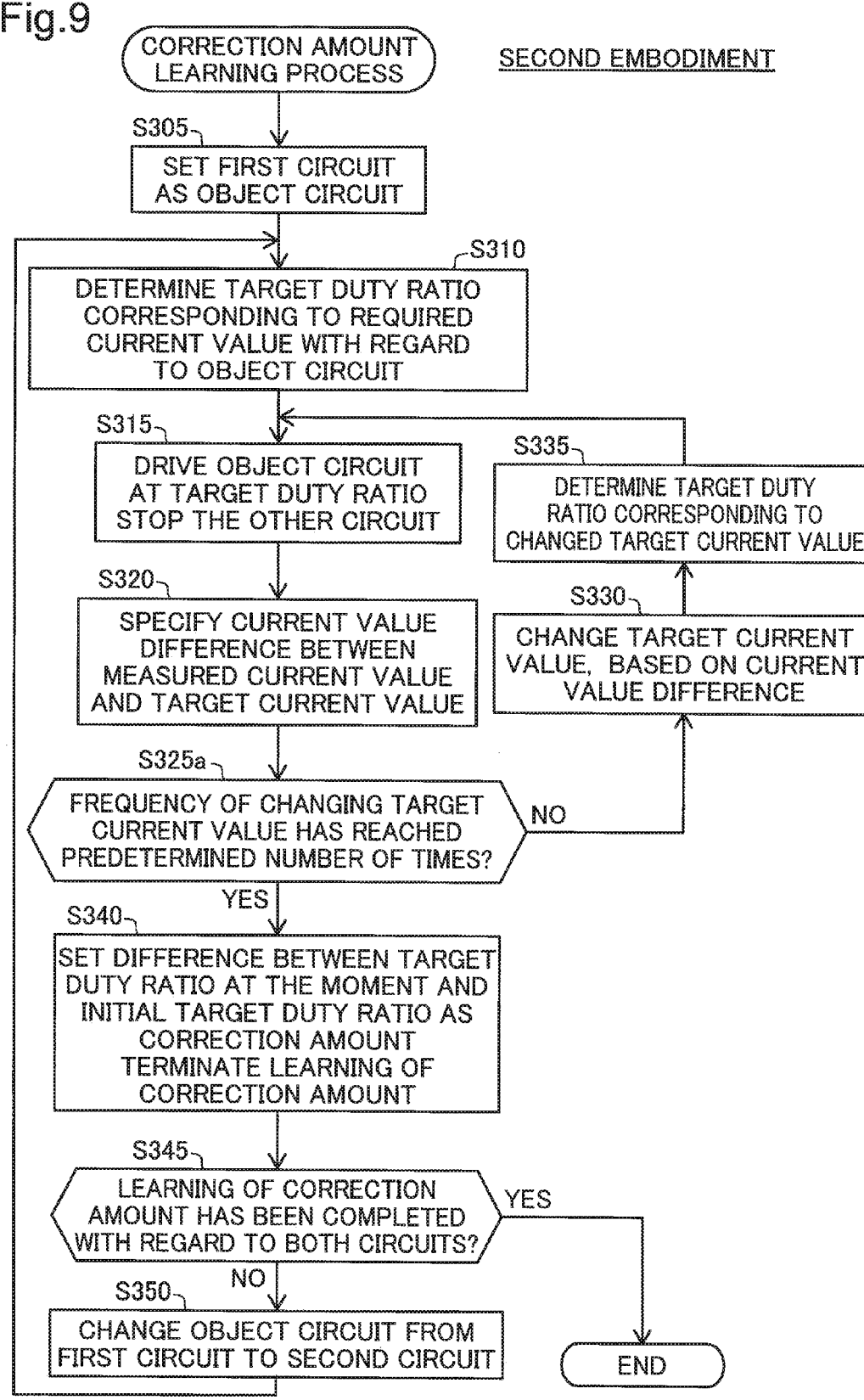
FIG. 9 is a flowchart showing a procedure of correction amount learning process according to a second embodiment.

FIG. 9 is a flowchart showing a procedure of correction amount learning process according to a second embodiment. A fuel cell system of the second embodiment has a system configuration similar to that of the fuel cell system 100 of the first embodiment. The correction amount learning process of the second embodiment shown in FIG. 9 differs from the correction amount learning process of the first embodiment shown in FIG. 6 by replacement of step S325 with step S325a. Otherwise the procedure of the correction amount learning process of the second embodiment is similar to the procedure of the correction amount learning process of the first embodiment. The like processing steps are expressed by the like step numbers, and the detailed description of such processing steps is omitted.

After specifying the current value difference at step S320, the controller 50 determines whether the frequency of changing the target current value (step S330) has reached a predetermined number of times (step S325a). When it is determined that the frequency of changing the target current value has not yet reached the predetermined number of times (step S325a: NO), the controller 50 proceeds to step S330 to continue the first correction amount learning process or the second correction amount learning process. When it is determined that the frequency of changing the target current value has reached the predetermined number of times (step S325a: YES), on the other hand, the controller 50 proceeds to step S340 described above.

According to this embodiment, the "predetermined number of times" at step S325a is determined by an experiment as a number of times when the current value difference becomes equal to or less than the predetermined reference value in the first embodiment described above during repetition of the first correction amount learning process or the second correction amount learning process. Accordingly, when it is determined at step S325a that the frequency of changing the target current value has reached the predetermined number of times, it is highly probable that the current value difference becomes equal to or less than the predetermined reference value. According to another embodiment, this experiment may be performed multiple times, and an average value or a maximum value may be set to the predetermined number of times at step S325a.

The fuel cell system of the second embodiment having the above configuration provides similar advantageous effects to those of the fuel cell system 100 of the first embodiment described above. Additionally, the fuel cell system of the second embodiment sets the correction amount when the frequency of changing the target current value has reached the predetermined number of times. This configuration shortens the time period required for the correction amount learning process.

C. Third Embodiment

Figure 10:
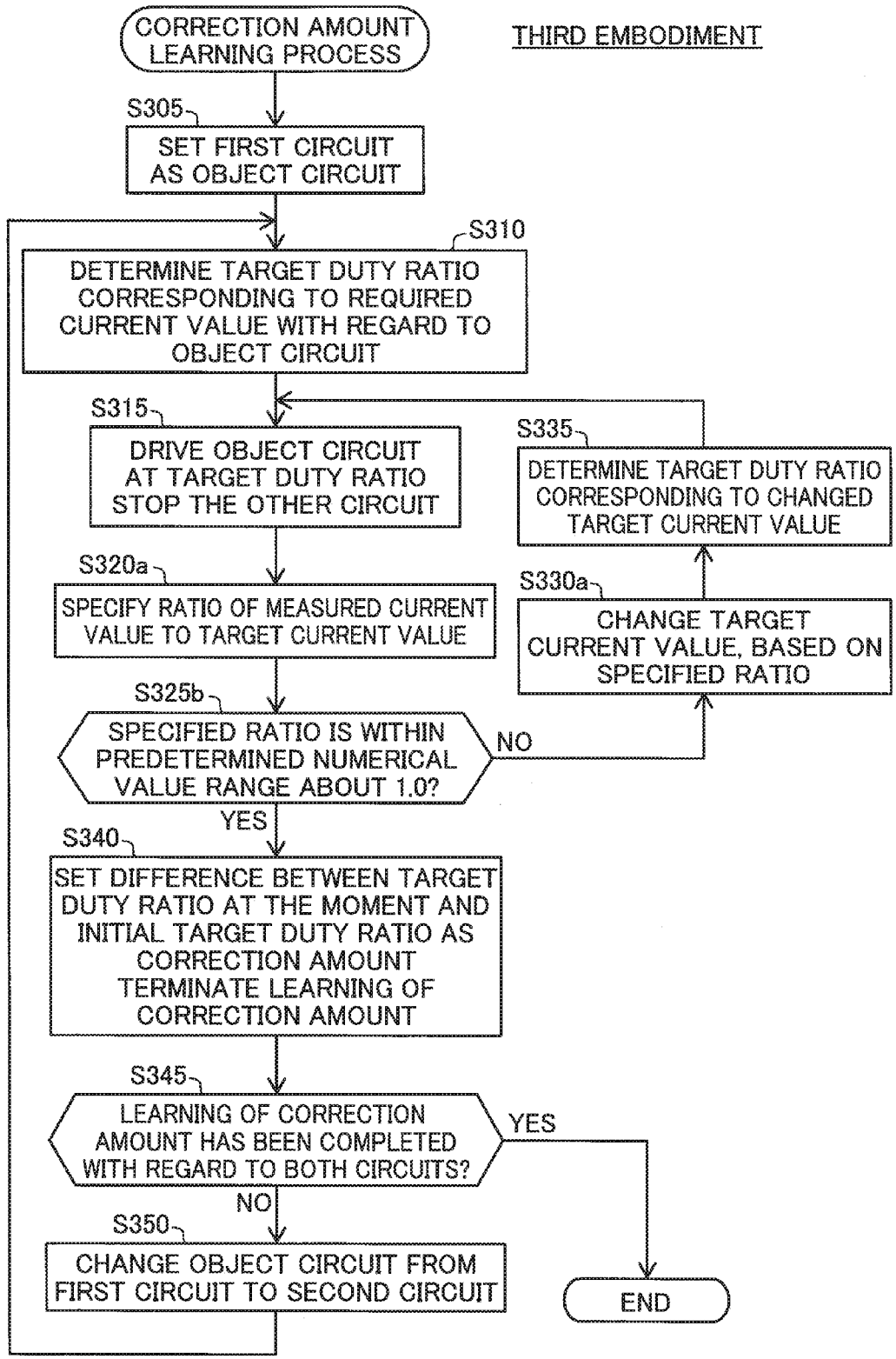
FIG. 10 is a flowchart showing a procedure of correction amount learning process according to a third embodiment.

FIG. 10 is a flowchart showing a procedure of correction amount learning process according to a third embodiment. A fuel cell system of the third embodiment has a system configuration similar to that of the fuel cell system 100 of the first embodiment. The correction amount learning process of the third embodiment shown in FIG. 10 differs from the correction amount learning process of the first embodiment shown in FIG. 6 by replacement of step S320 with step S320a, replacement of step S325 with step S325b and replacement of step S330 with step S330a. Otherwise the procedure of the correction amount learning process of the third embodiment is similar to the procedure of the correction amount learning process of the first embodiment. The like processing steps are expressed by the like step numbers, and the detailed description of such processing steps is omitted.

After driving the object circuit at the target duty ratio determined at step S310 and stopping the other circuit at step S315, the controller 50 specifies a ratio of the measured current value by the current sensor to the target current value (required current value) with regard to the voltage conversion circuit as the object circuit driven at the target duty ratio (step S320a).

The controller 50 subsequently determines whether the ratio specified at step S320a is within a predetermined numerical value range (step S325b). The predetermined numerical value range may be, for example, a range of 0.95 to 1.05. The predetermined numerical value range is, however, not limited to the range of 0.95 to 1.05 but may be any numerical value range about 1.0. The predetermined numerical value range is also not limited to the numerical value range about 1.0 but may be any numerical value range close to 1.0, for example, a range of 0.9 to 1.0.

When it is determined that the ratio specified at step S320a is not within the predetermined numerical value range (step S325b: NO), the controller 50 changes the target current value based on the ratio specified at step S320a (step S330a). When it is determined that the ratio specified at step S320a is within the predetermined numerical value range (step S325b: YES), on the other hand, the controller 50 proceeds to step S340 described above and terminates learning of the correction amount with regard to the object circuit. At step S340, the ratio specified at step S320a may be set as the correction amount. As understood from the description of this embodiment as well as the above first and the second embodiments, a difference amount between a duty ratio before correction and a duty ratio after correction may be set as the correction amount at step S340.

The fuel cell system of the third embodiment having the above configuration provides similar advantageous effects to those of the fuel cell system of the first embodiment described above. In the fuel cell system of the third embodiment, the series of processing of steps S315 to S335 is repeatedly performed until the ratio of the measured current value to the target current value enters the predetermined numerical value range about 1.0. This results in determining an adequate correction amount. As understood from the description of the third embodiment and the above first embodiment, the correction amount learning process may be repeatedly perform to determine the correction amount of the duty ratio in the object circuit such as to make the measured current value by the current sensor 67A closer to the required current value (target current value) for the object circuit and correct the duty ratio of the object circuit based on the determined correction amount. When the measured current value approaches the required current value to be within a predetermined range, a difference between the duty ratio before the correction and a duty ratio after the correction may be set as a set correction amount, and the object circuit may be changed to the other voltage conversion circuit. The correction amount learning process may then be repeatedly performed with regard to the changed voltage conversion circuit.

D. Modifications

D1. Modification 1

Figure 11:
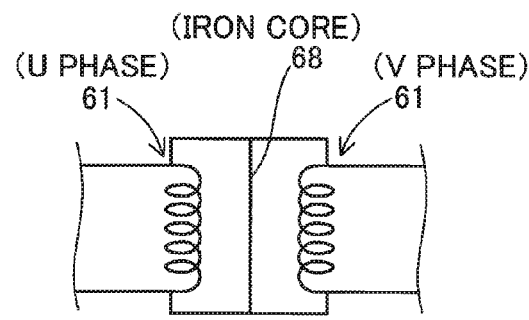
FIG. 11 is a diagram illustrating the schematic configuration of reactors according to Modification 1.

In each of the circuit sets 70A and 70B of the above respective embodiments, the reactors 61 of the two voltage conversion circuits may share a single iron core. FIG. 11 is a diagram illustrating the schematic configuration of reactors 61 according to Modification 1. FIG. 11 illustrates two reactors 61 included in the first circuit set 70A or more specifically a U-phase reactor 61 and a V-phase reactor 61. As shown in FIG. 11, these two reactors 61 share a single iron core 68. In the second circuit set 70B, a W-phase reactor 61 and an X-phase reactor 61 also share a single iron core, although not being specifically illustrated. In the case of single driving described above, in each of the circuit sets 70A and 70B, while one voltage conversion circuit is driven at a target duty ratio, the other voltage conversion circuit is at stop. The configuration that the reactors 61 of these two voltage conversion circuits share an iron core suppresses the influence of a change in magnetic flux generated in the reactor 61 of the other voltage conversion circuit that is at stop on the reactor 61 of one voltage conversion circuit that is driven. This configuration reduces the manufacturing cost of the fuel cell converter 11 and reduces the weight of the fuel cell converter 11, compared with the configuration that the reactors 61 of the respective voltage conversion circuits individually have iron cores.

D2. Modification 2

In the respective embodiments described above, the two voltage conversion circuits are arranged to share one (single) current sensor. The number of the voltage conversion circuits that share one current sensor is, however, not limited to two, but three or more voltage conversion circuits may be arranged to share one current sensor. For example, the four voltage conversion circuits 11U to 11X may be arranged to share one current sensor. In this modified configuration, for example, a driving sequence may be determined in advance. When the number of driving phases is determined to be "1" based on the required current value, only one phase may be driven in the predetermined driving sequence, while the other phases may be at stop. Learning of the correction amount may then be performed with regard to the phase that is currently driven. The total number of voltage conversion circuits, i.e., the total number of phases, is not limited to 4 described in the above embodiment but may be any number that is equal to or greater than 2. In this modification, any number (that is two or more) of voltage conversion circuits may be arranged to share one current sensor.

D3. Modification 3

In the respective embodiments described above, the first correction amount learning process and the second correction amount learning process are performed when the number of driving phases determined based on the input required current value is less than the total number of the voltage conversion circuits. The present disclosure is, however, not limited to this configuration. The first correction amount learning process and the second correction amount learning process may also be performed when the determined number of driving phases is equal to the total number of the voltage conversion circuits. In this modified configuration, the required current value is not provided when the number of driving phases determined based on the required current value is equal to the total number of the voltage conversion circuits. The required current value may, however, be provided by accurately adjusting the duty ratio corresponding to the required current value in each of the voltage conversion circuits, when the number of driving phases is subsequently reduced to be less than the total number of the voltage conversion circuits.

D4. Modification 4

The configuration of each of the embodiments described above includes the smoothing capacitor 66. The smoothing capacitor 66 may, however, be omitted as appropriate.

D5. Modification 5

In the respective embodiments described above, the first circuit set 70A is associated with the number of driving phases of "1", as the circuit set of single driving. The present disclosure is, however, not limited to this configuration. For example, the second circuit set 70B may be associated with the number of driving phases of "1". In another example, a single driving sequence that initially specifies the first circuit set 70A as the circuit set of single driving and subsequently specifies the second circuit set 70B as the circuit set of single driving may be associated with the number of driving phases of "1". In this modified configuration that the single driving sequence is associated with the number of driving phases of "1", for example, at step S135 in the first cycle of the control process performed after determination of the number of driving phases to "1", the controller 50 may specify the first circuit set 70A as the circuit set of single driving and perform learning of the correction amount with regard to the two voltage conversion circuits 11U and 11V. The controller 50 may subsequently specify the second circuit set 70B as the circuit set of single driving and perform learning of the correction amount with regard to the two voltage conversion circuits 11W and 11X. In this modified configuration, the two voltage conversion circuits constituting the other circuit set are both at stop, while single driving is performed in one circuit set. The single driving sequence that is associated with the number of driving phases of "1" may be reverse of the sequence of the above description.

Similarly, the single driving sequence that initially specifies the first circuit set 70A as the circuit set of single driving and subsequently specifies the second circuit set 70B as the circuit set of single driving may also be associated with the number of driving phases of "3". In this modified configuration, the two voltage conversion circuits constituting the other circuit set are both driven at the target duty ratio, while single driving is performed in one circuit set.

D6. Modification 6

According to the second embodiment, it is determined whether learning of the correction amount is to be terminated with regard to the first circuit or the second circuit (steps S315 to S335), based on whether the frequency of changing the target current value has reached the predetermined number of times. The present disclosure is, however, not limited to this configuration. For example, whether learning of the correction amount is to be terminated may be determined, based on whether a frequency of determining the target duty ratio (i.e., the number of executions of step S335) has reached a predetermined number of times, instead of the frequency of changing the target current value (i.e., the number of executions of step S330). In another example, whether learning of the correction amount is to be terminated may be determined, based on whether a measured time period elapsed since the first execution of step S315 has reached a predetermined time period. In this modified configuration, the first correction amount learning process or the second correction amount learning process may be performed repeatedly, and a time period elapsed until the current value difference becomes equal to or less than the predetermined value in the first embodiment described above may be determined experimentally. This experimentally determined time period may be set as the predetermined time period.

D7. Modification 7

In the respective embodiments described above, the correction amount learning process changes the object circuit after learning of the correction amount with regard to the first circuit and subsequently performs learning of the correction amount with regard to the second circuit. The present disclosure is, however, not limited to this configuration. For example, the correction amount learning process may perform learning of the correction amount with regard to only one voltage conversion circuit determined in advance in the circuit set of single driving and may perform learning of the correction amount with regard to the other voltage conversion circuit during dual driving. More specifically, during single driving, the correction amount learning process may perform learning of the correction amount with regard to the first circuit. During dual driving, the correction amount learning process may determine a difference value between a sum of required current values for the first circuit and the second circuit and a measured current value by a current sensor used in common by these two circuits, subtract a current value difference with regard to the first circuit determined at step S320 described above or more specifically a current value difference determined at step S320 in the last cycle from the determined difference value, and determine an estimated current value difference with regard to the second circuit. The correction amount learning process may sequentially and repeatedly change a target current value with regard to the second circuit based on the estimated current value difference (corresponding to the processing of step S330), determine a target duty ratio corresponding to the changed target current value (corresponding to the processing of step S335) and drive the second circuit at the determined target duty ratio (corresponding to the processing of step S315), so as to perform learning of the correction amount with regard to the second circuit.

Figure 12:
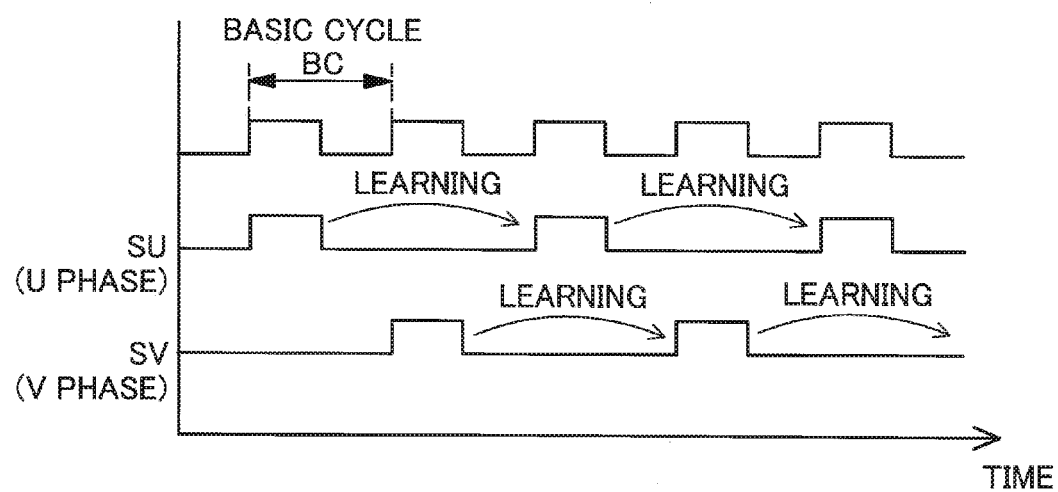
FIG. 12 is a diagram illustrating one exemplary timing chart of control signals SU and SV according to a modification.

In another example, in the circuit set for single driving, the two voltage conversion circuits may be driven alternately. FIG. 12 is a diagram illustrating one exemplary timing chart of control signals SU and SV according to a modification. FIG. 12 illustrates the timing chart of the control signals SU and SV when the number of driving phases is determined to be "2", the first circuit 70A is specified as the circuit set of single driving, and the correction amount learning process is performed with regard to the two voltage conversion circuits 11U and 11V of the first circuit set 70A. In this modification, the U phase and the V phase are driven alternately every basic cycle BC. Accordingly, the first current sensor 67A alternately measures the reactor current value of the U phase and the reactor current value of the V phase at every period. This modification then repeatedly changes a target current value when every object phase is to be driven next time, based on the measured current value. In other words, this modification alternately performs the correction amount learning process with regard to the U phase and the correction amount learning process with regard to the V phase, while alternately driving the U phase and the V phase at every cycle. In this modified configuration, under the conditions of a low target current value and a small duty ratio, the current value measured by the first current sensor 67A during driving of each phase indicates only the value of reactor current in each phase. This modified configuration can thus determine an adequate correction amount.

D8. Modification 8

In the respective embodiments described above, the present disclosure is applied to the voltage converter system 80 included in the fuel cell system 100. The present disclosure is, however, not limited to the voltage converter system 80 but may be applied to any of various converter apparatuses. For example, the present disclosure may be applied to a converter apparatus configured to control an output voltage of a power supply apparatus included in a DC power supply system mounted on, for example, an electric vehicle. Additionally, the present disclosure may be applied to a stepdown converter apparatus or an inverted converter apparatus, as well as to the boost converter apparatus.

D9. Modification 9

In the respective embodiments described above, the entire control process is performed by the controller 50. The present disclosure is, however, not limited to this configuration. For example, part of the control process may be performed by a function part other than the controller 50. For example, while the normal driving process shown in FIG. 5 may be performed by the controller 50, the correction amount learning process shown in FIG. 6 may be performed by the ECU 200. On the contrary, while the normal driving process may be performed by the ECU 200, the correction amount learning process may be performed by the controller 50. In these modified configurations, the controller 50 and the ECU 200 correspond to the subsidiary concepts of the first sub-controller and the second sub-controller in the claims and also correspond to the subsidiary concept of the controller in the claims. In another example, a different controller other than the controller 50 and the ECU 200 may be provided to perform part of the control process.

D10. Modification 10

In the respective embodiments described above, part of the configuration implemented by hardware may be replaced with the configuration by software. On the contrary, part of the configuration implemented by software may be replaced with the configuration by hardware. When part or the entirety of the functions of the present disclosure is implemented by software, the software (computer program) may be provided in the form stored in a computer readable recording medium. The "computer readable recording medium" is not limited to portable recording media such as flexible disks and CD-ROMs but includes various internal storage devices provided in the computer, such as RAMs and ROMs and various external storage devices fixed to the computer, such as hard disks. The term "computer readable recording medium" is accordingly used in the wider sense including any recording media that allow for non-transitory storage of data packets.

The disclosure is not limited to any of the embodiments and the modifications described above but may be implemented by a diversity of other configurations without departing from the scope of the disclosure. For example, the technical features of any of the embodiments and the modifications corresponding to the technical features of each of the aspects described in SUMMARY may be replaced or combined appropriately, in order to solve part or all of the problems described above or in order to achieve part or all of the advantageous effects described above. Any of the technical features may be omitted appropriately unless the technical feature is described as essential herein. For example, the present disclosure may be implemented by aspects described below.

(1) According to one aspect of the disclosure, there is provided a voltage converter system configured to convert an input voltage into a target voltage. The voltage converter system comprises a plurality of voltage conversion circuits connected in parallel to one another, each of the voltage conversion circuits including a reactor and a switching element provided to control a reactor current that is an electric current flowing through the reactor and being configured to convert the input voltage into the target voltage, a controller programmed to change a duty ratio of opening and closing the switching element included in each of the voltage conversion circuits by using an output request for the plurality of voltage conversion circuits and a set correction amount that is set in each of the voltage conversion circuits, so as to control driving and stopping of each of the voltage conversion circuits and control magnitude of the reactor current flowing in each of the voltage conversion circuits, and a single current sensor connected with the reactors of two voltage conversion circuits out of the plurality of voltage conversion circuits and configured to be used in common by the two voltage conversion circuits, in order to measure the reactor current, wherein when only one voltage conversion circuit out of the two voltage conversion circuits is driven as an object circuit, the controller repeatedly performs a correction amount learning process, wherein the correction amount learning process determines a correction amount of the duty ratio of the object circuit such as to make a measured current value by the current sensor closer to a target value of the reactor current in the object circuit, and corrects the duty ratio of the object circuit based on the determined correction amount, and when the measured current value approaches the target value to be within a predetermined range or when the correction amount learning process has been performed a predetermined number of times, the controller sets a difference amount between a duty ratio before the correction and a duty ratio after the correction as the set correction amount, changes the object circuit from the one voltage conversion circuit to the other voltage conversion circuit, and repeatedly performs the correction amount learning process with regard to the object circuit after the change.

The voltage converter system of this aspect drives only one voltage conversion circuit, while performing the correction amount learning process with regard to the one voltage conversion circuit. The value of reactor current in the one voltage conversion circuit can thus be accurately measured by the current sensor used in common by the two voltage conversion circuits. Accordingly this configuration enables an adequate value to be determined as the correction amount of the duty ratio (set correction amount) of the one voltage conversion circuit and enables the duty ratio to be accurately adjusted in the one voltage conversion circuit. Similarly, the voltage converter system of this aspect drives only the other voltage conversion circuit, while performing the correction amount learning process with regard to the other voltage conversion circuit. The value of reactor current in the other voltage conversion circuit can thus be accurately measured by the current sensor used in common by the two voltage conversion circuits. Accordingly this configuration enables an adequate value to be determined as the correction amount of the duty ratio (set correction amount) of the other voltage conversion circuit and enables the duty ratio to be accurately adjusted in the other voltage conversion circuit. Additionally, the current sensor used in the correction amount learning process with regard to the two voltage conversion circuits is the single current sensor used in common by the two voltage conversion circuits. This configuration suppresses expansion in size of the voltage converter system and an increase in manufacturing cost, compared with a configuration that a current sensor is provided for each voltage conversion circuit.

(2) In the voltage converter system of the above aspect, while only one voltage conversion circuit is driven as the object circuit, the controller repeatedly performs the correction amount learning process, wherein the correction amount learning process determines the correction amount of the duty ratio of the object circuit according to a difference between the measured current value by the current sensor and the target value of the reactor current in the object circuit and corrects the duty ratio of the object circuit based on the determined correction amount, and when the difference becomes equal to or less than a predetermined value or when the correction amount learning process has been performed a predetermined number of times, the controller sets a difference between a duty ratio before the correction and a duty ratio after the correction as the set correction amount, changes the object circuit from the one voltage conversion circuit to the other voltage conversion circuit, and repeatedly performs the correction amount learning process with regard to the object circuit after the change. In the voltage converter system of this aspect, the correction amount learning process is performed repeatedly to determine the correction amount according to the difference between the measured current value and the target value and correct the duty ratio based on the determined correction amount. This configuration thus enables an adequate set correction amount to be determined with high accuracy.

(3) In the voltage converter system of the above aspect, the controller determines number of voltage conversion circuits to be driven, out of the plurality of voltage conversion circuits, based on an input required current value, and performs the correction amount learning process with regard to the two voltage conversion circuits, when the determined number of voltage conversion circuits to be driven is less than a total number of the plurality of voltage conversion circuits. In the voltage converter system of this aspect, when the number of the voltage conversion circuits to be driven that is determined based on the input required current value is less than the total number of the voltage conversion circuits, the correction amount learning process is performed with regard to the two voltage conversion circuits. This configuration enables the required current value to be output even during the correction amount learning process.

(4) In the voltage converter system of the above aspect, the current sensor is connected with three or more voltage conversion circuits including the two voltage conversion circuits, out of the plurality of voltage conversion circuits, and is used in common by the three or more voltage conversion circuits. In the voltage converter system of this aspect, the current sensor is connected with the three or more voltage conversion circuits and is used in common by these three or more voltage conversion circuits. This configuration more effectively suppresses expansion in size of the voltage converter system and an increase in cost.

(5) The voltage converter system of the above aspect may further comprises a smoothing capacitor connected in parallel to the plurality of voltage conversion circuits, wherein the controller controls the plurality of voltage conversion circuits such that output currents from the respective voltage conversion circuits have phases shifted from one another. The voltage converter system of this aspect controls the plurality of voltage conversion circuits such that the output currents of the respective voltage conversion circuits have phases shifted from one another. This configuration reduces the ripple current in the smoothing capacitor and reduces the capacity of the smoothing capacitor.

(6) In the voltage converter system of the above aspect, the reactors of the two voltage conversion circuits are iron core-based reactors configured to share one iron core. In the voltage converter system of this aspect, the reactors of the two voltage conversion circuits are configured to share one iron core. This configuration reduces the manufacturing cost of the voltage converter system and reduces the weight of the voltage converter system, compared with a configuration that the reactors of the respective voltage conversion circuits individually have iron cores.

(7) In the voltage converter system of the above aspect, the controller comprises a first sub-controller programmed to control driving and stopping of each of the voltage conversion circuits and the magnitude of the reactor current in each of the voltage conversion circuits, and a second sub-controller programmed to perform the correction amount learning process and set the set correction amount. In the voltage converter system of this aspect, the controller comprises the first sub-controller and the second sub-controller. These two sub-controllers may be implemented by separate hardware configurations.

The present disclosure may be implemented by any of various aspects other than the voltage converter system, for example, a vehicle equipped with the voltage converter system, a control method of the voltage converter system, a method of adjusting a duty ratio of a switching element included in the voltage converter system, computer programs configured to implement these methods and non-transitory recording media in which such computer programs are recorded.

What is claimed is:

1. A voltage converter system configured to convert an input voltage into a target voltage, the voltage converter system comprising:
    a plurality of voltage conversion circuits connected in parallel to one another, each of the voltage conversion circuits including a reactor and a switching element provided to control a reactor current that is an electric current flowing through the reactor and being configured to convert the input voltage into the target voltage;
    a controller programmed to change a duty ratio of opening and closing the switching element included in each of the voltage conversion circuits by using an output request for the plurality of voltage conversion circuits and a set correction amount that is set in each of the voltage conversion circuits, so as to control driving and stopping of each of the voltage conversion circuits and control magnitude of the reactor current flowing in each of the voltage conversion circuits; and
    a single current sensor connected with the reactors of two voltage conversion circuits out of the plurality of voltage conversion circuits and configured to be used in common by the two voltage conversion circuits, in order to measure the reactor current, wherein
    when only one voltage conversion circuit out of the two voltage conversion circuits is driven as an object circuit, the controller repeatedly performs a correction amount learning process, wherein the correction amount learning process determines a correction amount of the duty ratio of the object circuit such as to make a measured current value by the current sensor closer to a target value of the reactor current in the object circuit, and corrects the duty ratio of the object circuit based on the determined correction amount, and
    when the measured current value approaches the target value to be within a predetermined range or when the correction amount learning process has been performed a predetermined number of times, the controller sets a difference amount between a duty ratio before the correction and a duty ratio after the correction as the set correction amount, changes the object circuit from the one voltage conversion circuit to other voltage conversion circuit, and repeatedly performs the correction amount learning process with regard to the object circuit after the change.

2. The voltage converter system according to claim 1, wherein
while only one voltage conversion circuit is driven as the object circuit, the controller repeatedly performs the correction amount learning process, wherein the correction amount learning process determines the correction amount of the duty ratio of the object circuit according to a difference between the measured current value by the single current sensor and the target value of the reactor current in the object circuit and corrects the duty ratio of the object circuit based on the determined correction amount, and
when the difference between the measured current value and the target value becomes equal to or less than a predetermined value or when the correction amount learning process has been performed a predetermined number of times, the controller sets the difference amount between the duty ratio before the correction and the duty ratio after the correction as the set correction amount, changes the object circuit from the one voltage conversion circuit to the other voltage conversion circuit, and repeatedly performs the correction amount learning process with regard to the object circuit after the change.

3. The voltage converter system according to claim 1, wherein
the controller determines number of voltage conversion circuits to be driven, out of the plurality of voltage conversion circuits, based on an input required current value, and performs the correction amount learning process with regard to the two voltage conversion circuits, when the determined number of voltage conversion circuits to be driven is less than a total number of the plurality of voltage conversion circuits.

4. The voltage converter system according to claim 1, wherein
the single current sensor is connected with three or more voltage conversion circuits including the two voltage conversion circuits, out of the plurality of voltage conversion circuits, and is used in common by the three or more voltage conversion circuits.

5. The voltage converter system according to claim 1, further comprising:
a smoothing capacitor connected in parallel to the plurality of voltage conversion circuits, wherein
the controller controls the plurality of voltage conversion circuits such that output currents from the respective voltage conversion circuits have phases shifted from one another.

6. The voltage converter system according to claim 1, wherein
the reactors of the two voltage conversion circuits are iron core-based reactors configured to share one iron core.

7. The voltage converter system according to claim 1, wherein the controller comprises:
a first sub-controller programmed to control driving and stopping of each of the voltage conversion circuits and to control the magnitude of the reactor current in each of the voltage conversion circuits; and
a second sub-controller programmed to perform the correction amount learning process and set the set correction amount.

8. A control method of a voltage converter system configured to convert an input voltage into a target voltage, wherein
the voltage converter system comprises:
a plurality of voltage conversion circuits connected in parallel to one another, each of the voltage conversion circuits including a reactor and a switching element provided to control a reactor current that is an electric current flowing through the reactor and being configured to convert the input voltage into the target voltage; and
a single current sensor connected with the reactors of two voltage conversion circuits out of the plurality of voltage conversion circuits and configured to be used in common by the two voltage conversion circuits, in order to measure the reactor current,
the control method comprising:
(a) changing a duty ratio of opening and closing the switching element included in each of the voltage conversion circuits by using an output request for the plurality of voltage conversion circuits and a set correction amount that is set in each of the voltage conversion circuits, so as to control driving and stopping of each of the voltage conversion circuits and control magnitude of the reactor current flowing in each of the voltage conversion circuits;
(b) repeatedly performing a correction amount learning process when one voltage conversion circuit out of the two voltage conversion circuits is specified as an object circuit and only the one voltage conversion circuit out of the two voltage conversion circuits is driven by changing the duty ratio of opening and closing the switching element included in the one voltage conversion circuit, wherein the correction amount learning process determines a correction amount of the duty ratio of the object circuit such as to make a measured current value by the single current sensor closer to a target value of the reactor current in the object circuit and corrects the duty ratio of the object circuit based on the determined correction amount, and
(c) when the measured current value approaches the target value to be within a predetermined range or when the correction amount learning process has been performed a predetermined number of times, setting a difference amount between a duty ratio before the correction and a duty ratio after the correction as the set correction amount, changing the object circuit from the one voltage conversion circuit to the other voltage conversion circuit, and repeatedly performing the correction amount learning process with regard to the object circuit after the change.

* * * * *